May 24, 1966  L. O. HEWKO  3,252,355
PLANETARY FRICTION DRIVE
Filed Jan. 10, 1964  3 Sheets-Sheet 1
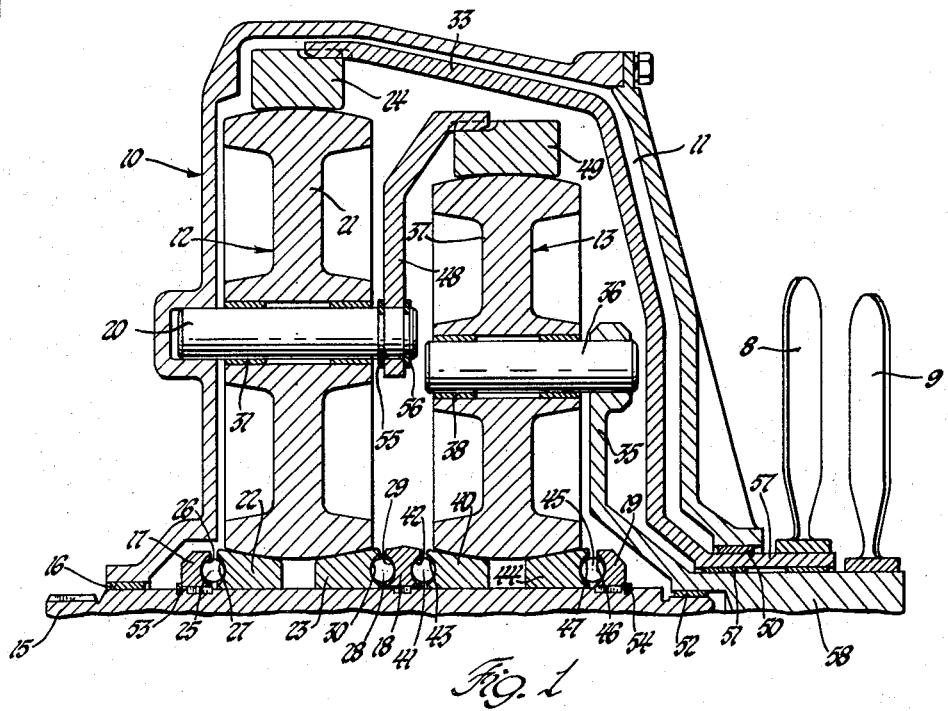
INVENTOR.
Lubomyr O. Hewko
BY
Robert L. Spencer
ATTORNEY May 24, 1966

L. O. HEWKO 3,252,355

PLANETARY FRICTION DRIVE

Filed Jan. 10, 1964

INVENTOR.
Lubomyr O. Hewko
BY
Robert L. Spencer
ATTORNEY

May 24, 1966

L. O. HEWKO 3,252,355

PLANETARY FRICTION DRIVE

Filed Jan. 10, 1964

INVENTOR.
Liborayr O. Hewko
BY
Robert L. Spencer
ATTORNEY

United States Patent Office 3,252,355
Patented May 24, 1966

3,252,355
PLANETARY FRICTION DRIVE
Lubomyr O. Hewko, Warren, Mich., assignor to General Motors Corporation, Detroit, Mich., a corporation of Delaware
Filed Jan. 10, 1964, Ser. No. 336,917
9 Claims. (Cl. 74—796)

This invention relates to friction drive mechanisms and more particularly to multistage friction drives particularly designed for installations wherein both space requirements and noise limitations are critical. The invention is particularly well adapted for use as a speed reducer for a torpedo drive wherein the torpedo is driven by means of contra-rotating propellers.

In certain applications such as surface ships, submarines and torpedo drives, it is advantageous to have two contra-rotating propellers propelling the craft. It is also advantageous to have these propellers always operating at substantially the same torque, thus minimizing the net torque reaction from the propellers on the craft which tends to spin the craft about its longitudinal axis. It is further advantageous to have the propellers automatically torque equalized so that if for any reason the torque applied to one propeller is decreased (as, for instance, due to size differences, excessive cavitation or partial emergence), the speed of that particular propeller will automatically increase and the speed of the other propeller will automatically decrease so as to equalize the torque between the propellers at all times. It is also of great importance to have the two propellers running at a substantially reduced speed from that of the prime mover.

It is further necessary to have the noise generated by the speed reducing, power dividing, torque equalizing, dual output mechanism to be as low as possible so as to minimize possibility of noise detection of the craft in naval warfare.

The arrangements disclosed and described herein satisfy the requirements for torque equalized, vibration free, quiet and efficient drive of contra-rotating dual output and thus are ideally suited for use in underwater craft and other applications where quiet operation is of utmost importance.

Various structural embodiments of the invention are shown in FIGURES 1 through 5 in which:

FIGURE 1 is a partial cross-sectional view of a first embodiment of the invention with the support housing broken away.

FIGURE 2 is a partial cross-sectional view of a second embodiment of the invention with the support housing broken away.

Figure 3:
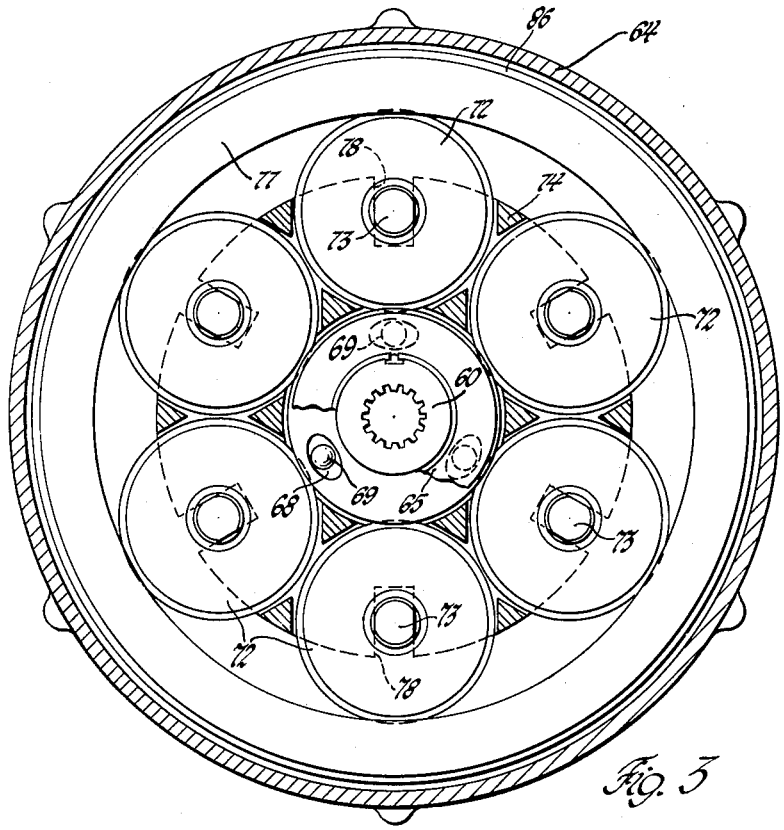
FIGURE 3 is an end view of the embodiment of FIGURE 2 with the end of the housing removed.

Referring to FIGURE 1, there is shown a dual output contra-rotating propeller drive having a fixed nonrotatable housing 10 forming a chamber 11 having first and second friction drive assemblies indicated generally at 12 and 13 disposed therein. A power input shaft 15 driven by a suitable prime mover or engine, not shown, extends through housing 10 into chamber 11 and is supported on housing 10 by means of a bushing 16. Three ball ramp discs 17, 18 and 19 are driven by shaft 15. Friction drive unit 12 includes a support 20 supported in housing 10 and supporting a pinion 21 in frictional contact with a pair of suns 22 and 23 and a ring 24. Suns 22 and 23 are supported on input shaft 15 for axial motion with respect to shaft 15 and for limited angular rotation with respect to shaft 15. A ball 25 is disposed between ball ramps 26 and 27 formed on drive disc 17 and on sun 22, respectively. A second ball 28 is disposed between ball ramps 29 and 30 formed on drive disc 18 and on sun 23, respectively. Pinion 21 is rotatably supported on carrier 20 by means of a bushing 31. Ring 24 is connected to a first power delivery shaft 57 by means of a drum 33. Shaft 57 drives a propeller 8.

Planetary unit 13 includes a planet carrier 35 supported upon a second power delivery shaft 58 and fixed to said shaft for driving the same. As shown, carrier 35 is formed integrally with shaft 58 and supports a pin 36 having a planet pinion 37 rotatably supported thereon by means of a bushing 38. A pair of suns 40 and 44 are supported on input shaft 15 for axial movement and limited angular rotation with respect to shaft 15. A ball 41 is disposed between a second ball ramp 42 formed on disc 18 and a ball ramp 43 formed on sun 40. A fourth ball 45 is disposed between ball ramps 46 and 47 formed on disc 19 and sun 44, respectively. Pinion 37 contacts a ring 49 connected to support 20 of unit 12 and fixed against rotation by means of a drum 48. Bushings 50, disposed between housing 10 and first power delivery shaft 57; 51, disposed between shaft 57 and second power delivery shaft 58; and 52 disposed between second power delivery shaft 58 and the end of power input shaft 15; support these shafts for rotation in housing 10. Snap rings 53 and 54 at the ends of drive discs 17 and 19 transfer thrust reaction from discs 17 and 19 to input shaft 15. Drum 48 is fixed to support 20 by means of snap rings 55 and 56. As stated, carrier 20, drum 48 and ring 49 are grounded to housing 10 so as to be fixed against rotation. In actual construction three pinions 21 and three pinions 37 are used, although only one of each is shown. A propeller 8 is driven by shaft 57 and a propeller 9 is driven by shaft 58.

In operation, assuming input shaft 15 is rotated clockwise, drive discs 17, 18 and 19 will be driven clockwise. Suns 22 and 23 will be driven clockwise through action of balls 25 and 28 and the ball ramps associated therewith such that suns 22 and 23 will move axially toward each other such that the frictional contact surfaces of the suns and pinion 21 are forced into non-slipping frictional engagement. The axial thrust applied to the suns increases with torque being transmitted and decreases with decrease in torque. This contributes to long useful life of the friction contact surfaces by preventing excessive loading when such loading is not necessary and, at the same time, preventing slippage of the friction surfaces. With shaft 15 driven clockwise, ring 24 will be driven counterclockwise and will drive power delivery shaft 57 counterclockwise at reduced speed of rotation to that of input shaft 15.

Operation of the drive unit 13 is similar to that of unit 12 except that planet carrier 35 and power delivery shaft 58 are driven in a clockwise direction. Suns 40 and 44 are driven through balls 41 and 45 in a clockwise direction and increase the contact of the friction surfaces as torque increases. The rolling friction contact surfaces of all of the suns are conical, while the rolling friction surfaces of the pinions are spheroidal in shape.

In the particular application of the speed reducer, namely torpedo drive, it is desirable that the two output shafts 57 and 58 rotate in opposite directions at the same speed. To accomplish this it is necessary to adjust the size of the two units appropriately. It will be noted that the pinion and ring of second unit 13 are of smaller diameter than the pinion and ring of unit 12. This is necessary in order to have shaft 58 rotate at the same speed as shaft 57. It also permits space within housing 10 for drum 33 to connect ring 24 to shaft 57 without requiring any enlargement of chamber 11 beyond that required to accommodate ring 24, and contributes to the compact size of the design. This is important in installations where space requirements are critical such as in a torpedo.

Considering the fixed carrier geometry used in the first unit 12, the speed ratio is:

$$R_{N_1} = \frac{\text{Output Speed}}{\text{Input Speed}} = \frac{\text{Ring Speed}}{\text{Sun Speed}} = \frac{-R_{S_1}}{R_{R_1}} \quad (1)$$

Where $R_S$ = Sun Radius
$R_R$ = Ring Radius

In these equations, subscripts refer to the units 12 and 13 and, more specifically, subscript 1 refers to unit 12 and subscript 2 refers to unit 13, and the negative sign implies reversal of rotation between output and input.

For the fixed ring geometry used in the second unit (unit 13) the speed ratio is:

$$R_{N_2} = \frac{\text{Output Speed}}{\text{Input Speed}} = \frac{\text{Carrier Speed}}{\text{Sun Speed}} = \frac{R_{S_2}}{R_{R_2} + R_{S_2}} \quad (2)$$

To satisfy conditions of equal output speed and contra-rotation we set:

$$R_{N_1} = R_{N_2} \text{ or } \frac{R_{S_1}}{R_{R_2}} = \frac{R_{S_2}}{R_{R_2} + R_{S_2}}$$

As is apparent from the expressions for $R_{N_1}$ and $R_{N_2}$, they must always be less than 1; therefore, the drive is a speed reducer.

In the embodiment illustrated the sun radii of the two units is the same. With this arrangement, then:

$$\frac{R_{S_1}}{R_{R_1}} = \frac{R_{S_1}}{R_{R_2} + R_{S_1}} \text{ or } R_{R_2} = R_{R_1} - R_{S_1}$$

This last expression indicates that for equal speed reduction and contra-rotation, the magnitude of the ring radius of the second unit (13) must always be smaller from the first ring radius (unit 12) by the magnitude of the sun radius. This is very convenient since it simplifies the drive by allowing the output drum member 33 of the first unit 12 to have a very simple shape, and to be disposed in chamber 11.

The input power from shaft 15 is split equally between the two units 12 and 13 so that each power delivery shaft carries essentially one-half of the input power at reduced speed and increased torque, where the torque ratio is the reciprocal of the speed ratio divided by two (due to the power split). In both units the torque from the input shaft is transmitted to the output shaft by traction of the rolling friction contacts between the sun and planets and between the ring and the planets. As the torque is applied to the ball ramp mechanisms located on the rear faces of the suns, the suns of each unit move axially toward each other and generate normal loads between the contact surfaces of the suns and the contact surface of the planet. This normal force, when multiplied by the coefficient of friction, results in tangential force. When the tangential force is multiplied by the radius at which it is acting, the desired torques are produced. In the present embodiment, the speeds of the two output shafts will be equal and the direction of rotation opposite. In certain applications, the torque need not be the same, and thus, torque equalization has not been provided for in this embodiment. While only a single pinion is shown in each unit, three such pinions are provided for each unit. The assembly of FIGURE 1 is capable of a maximum speed reduction of 8 to 1.

Referring to FIGURES 2 and 3, there is shown an improvement wherein the speed reducer incorporates dual, torque equalized contra-rotating output. In this improved arrangement the torque input to the second speed reducer is transmitted from the first speed reducer, rather than directly from the power input shaft as was true of the first embodiment.

A power input shaft 60 drives a pair of suns 61 and 62 of a first speed reducer unit 63. Shaft 60 is rotatably supported in a fixed housing 64 and drives a drive disc 65 keyed to shaft 60 for axial motion with respect thereto. A snap ring 66 retains disc 65 on shaft 60 and absorbs thrust from disc 65. A ball 69 is disposed between ball ramps 67 and 68 formed on disc 65 and sun 61, respectively. An upstanding flange 70 formed on shaft 60 extends axially into a ramp 71 formed on the end of sun 62 for driving sun 62. A pinion 72 is rotatably supported upon a planet carrier 74 by means of a pin 73, there being a suitable bushing 75 disposed on pin 73 between the pin and pinion. Pinion 72 contacts a ring 77. As best shown in FIGURE 3, the ends of pin 73 are rectangular in shape and are disposed in rectangular slots 78 in carrier 74 such that pin 73 does not rotate but is movable radially outwardly with respect to carrier 74. Carrier 74 is bolted to an upstanding flange 79 formed on a first power delivery shaft 80 by means of bolts 79a such that shaft 80 is driven by carrier 74. Bushings 81 and 82 are disposed between shaft 60 and shaft 80 and between the end of shaft 60 and flange 79, respectively. A bushing 83 is disposed between housing 64 and carrier 74. Bushings 82 and 83 serve as thrust bushings. Shaft 80 drives a propeller 112.

A second speed reducer unit indicated generally at 85 includes a power input ring 87 connected for rotation with ring 77 by means of a drum 86, a pinion 88 and a pair of reaction suns 89 and 90. Pinion 88 is rotatably supported on a planet carrier 91 by means of a pin 92 and bushing 93. The ends of the pin 92 are rectangular and fit into rectangular slots formed on carrier 91 such that the pin can move radially with respect to carrier 91 in a manner similar to pin 73 and carrier 74. Housing 64 has an axially extending hollow cylindrical support member or boss 95 formed thereon for supporting suns 89 and 90 and a reaction disc 98 thereon. An axially extending flange 99 on housing 64 extends into a ramp 100 on the end of sun 90 to ground the sun 90 to the housing. Disc 98 is keyed to member 95 and held on member 95 by means of a snap ring 101. A ball 102 is disposed between ball ramps 103 and 104 formed on the end of sun 89 and disc 98, respectively. Planet carrier 91 is bolted to an upstanding flange 106 on a power delivery shaft 107 by means of bolts 105. Bushings 108 and 109 are disposed between flange 79 and flange 106 and between disc 98 and flange 106, respectively. Output shaft 80 extends through output shaft 107 and is rotatably supported therein by means of a bushing 110. A bushing 111 is disposed between housing 64 and carrier 91 and a bushing 114 is disposed between housing 64 and shaft 107. Sleeve shaft 107 drives a propeller 113.

In the embodiment of FIGURES 2 and 3, the two speed reducer units 63 and 85 are identical in size, which is necessary to achieve torque balance. In operation, input shaft 60 is driven clockwise by means of a suitable prime mover, not shown. The carriers of the two units are the outputs, driving shaft 80 clockwise and shaft 107 counterclockwise. Rings 77 and 87, joined by drum 86, both rotate as a unit in a clockwise direction. The reaction suns 89 and 90 of unit 85 are the only fixed members in the complete assembly. The suns 89, 90 balance input torque, while the torque at the two output shafts is balanced mutually. As a result, there is no net torque reaction on the craft being propelled except for internal torque reaction between the speed reducer case 64 and the prime mover case (not shown) which is internally carried by the housing.

To select the geometry of the two units, in order to have counter-rotation:

$$R_{N_1} = -R_{N_2}$$

Writing the usual speed relationship, we arrive at the result:

$$R_{N_1} = \frac{R_{S_1}}{2(R_{R_1}+R_{S_1})} = -R_{N_2} = \frac{R_{S_2}}{2(R_{R_2}+R_{S_2})} \quad (3)$$

In addition, conditions for torque balance must be satisfied, thus:

$$T_{OUT_1} = T_{OUT_2}$$

Combining the expressions for torque and speed we get:

$$\frac{T_{OUT_2}}{1+\frac{R_{S_2}}{R_{R_2}}} = -\frac{T_{OUT_1}}{1+\frac{R_{S_1}}{R_{S_2}}}$$

or that $$\frac{R_{S_1}}{R_{R_1}} = \frac{R_{S_2}}{R_{R_2}}$$

Now, letting $R_{R_1} = R_{R_2}$ we see that $R_{S_1}$ must equal to $R_{S_2}$, making both drives the same size.

Algebraic Expression 3 can be rewriten as:

$$R_{N_1} = -R_{N_2} = \frac{R_S}{2(R_R+R_S)} \quad (4)$$

Looking at the above Expression 4 and comparing it with the similar Expressions 1 and 2 for ratios of the previously described embodiment of FIGURE 1, it is apparent that for the same radii, the ratio in Expression 4 has been increased by a factor of two. This enables the arrangement of FIGURE 2 to be used for considerably higher reduction ratios, such as for instance, gas turbine drives. The practical geometry limits for reduction ratio of the FIGURE 1 embodiment is a maximum of 8 to 1. If greater ratios are desired, the FIGURE 1 arrangement could not be used because the sun becomes too small as a practical matter to accommodate adequate drive shafting. However, the unit shown in FIGURE 2, having the same diameter could be used for a 16 to 1 reduction ratio. This constitutes a great practical improvement.

Another substantial improvement accomplished by the FIGURE 2 assembly lies in the increased number of planets that can be used. The larger the number of planets incorporated in a drive, the lower is the torque per planet, consequently resulting in greatly improved fatigue durability of the drive. Comparing the designs of FIGURES 1 and 2 which both illustrate a geometry needed for an 8 to 1 reduction ratio, it is apparent that the design of FIGURE 2 will have considerably improved useful life due to its ability to accommodate six planets, whereas the FIGURE 1 design has space for only three planets.

To summarize the advantages of the FIGURE 2 embodiment, it can be stated that:

(1) It provides two counter-rotating and torque balanced output shafts.

(2) It provides double the speed reduction ratio compared with conventional drives.

(3) It has longer fatigue life due to its ability to accommodate a greater number of planets for the same reduction ratio.

(4) The rotating bodies are of equal size, reducing the number of different parts required.

Figure 4:
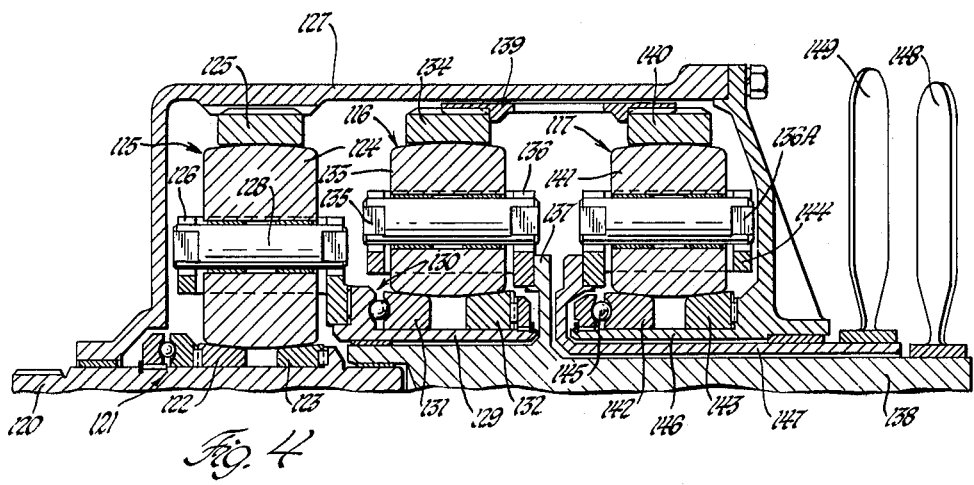
FIGURE 4 is a partially sectional view of a third embodiment of the invention with the housing broken away.

A further improved arrangement of planetary friction drive capable of higher reduction ratio than that of the FIGURE 3 embodiment is shown in FIGURE 4. The drive arrangement of FIGURE 4 is capable of reduction ratio of 50 to 1, whereas that of FIGURE 3 is 16 to 1, and the arrangement represents a combination of a first unit generally indicated at 115 and two additional units 116 and 117. Unit 115 includes an engine driven power input shaft 120 driving input suns 122 and 123 through a ball ramp torque loading device generally indicated at 121. A planet carrier 126 supports a planet pinion 124 in friction contact with a reaction ring 125 fixed to a housing 127. In practice, four pinions 124 are supported in carrier 126, although only one is shown. Planet pins 128 are supported in carrier 126 for radial motion with respect to the carrier in the manner disclosed in FIGURES 2 and 3. The reduction units 116 and 117 are similar to the units 63 and 85 of FIGURE 2. However, in FIGURE 4, the suns 131 and 132 are supported upon an extension 129 of planet carrier 126 and are driven through the ball ramp torque loading device indicated generally at 130 at carrier speed of rotation rather than at prime mover input speed. A planet pinion 133 is supported in friction contact with suns 131 and 132 and with a ring 134 by means of a pin 135 supported in a carrier 136. Carrier 136 is connected to a flange 137 on a first power delivery shaft 138 for driving shaft 138, which drives a propeller 148.

Drive unit 117 includes a power input ring 140 fixed for rotation with ring 134 by means of a drum 139. A pinion 141 is in friction contact with ring 140 and a pair of reaction suns 142 and 143, and drives a power output carrier 144. Suns 142 and 143 are grounded to housing 127 and include a ball ramp torque loading device 145 for grounding sun 142 to a cylindrical hollow support boss 146 fixed to housing 127. A final power delivery shaft 147 is driven by carrier 144, and drives a propeller 149.

It will be noted that the pinions 124 (there being four such pinions) of unit 115 are of greater diameter than the pinions 133 and 141 of units 116 and 117. Units 116 and 117 each have six pinions supported in their respective carriers, the pinions 133 and 141 of the units 116 and 117 being of equal diameter. Here again, the pinion support pins 128, 135 and 136A are positioned in slots in their respective carriers in the manner described in connection with FIGURES 2 and 3 so as to be radially movable with respect to their respective carriers.

The reduction ratio of unit 115 having a fixed ring gear was previously shown by Equation 2 to be equal to $$R_{N_1} = \frac{R_{S_1}}{R_{R_1}+R_{S_1}}$$

If this reduced speed is used as input to a double planetary arrangement such as was shown in FIGURE 2, there is provided a drive having dual, contra-rotating and torque balanced output having greatly increased overall reduction ratio, as is shown by the expression below:

Since $$R_{N_2} = \frac{R_{S_2}}{2(R_{S_2}+R_{R_2})}$$

then $$R_{N_1} \text{ overall} = R_{N_1} \times R_{N_2} = \frac{R_{S_1}}{R_{R_1}+R_{S_1}} \times \frac{R_{S_2}}{2(R_{R_2}+R_{S_2})}$$

and $$R_N \text{ overall} = R_{N_1} \times (-R_{N_2}) = \frac{R_{S_1}}{R_{R_1}+R_{S_1}} \times \frac{R_{S_2}}{2(R_{R_2}+R_{S_2})}$$

The embodiment in FIGURE 4 provides the torque balance and contrarotation requirements and provides large reduction (50 to 1) without resorting to extreme geometric configuration.

Figure 5:
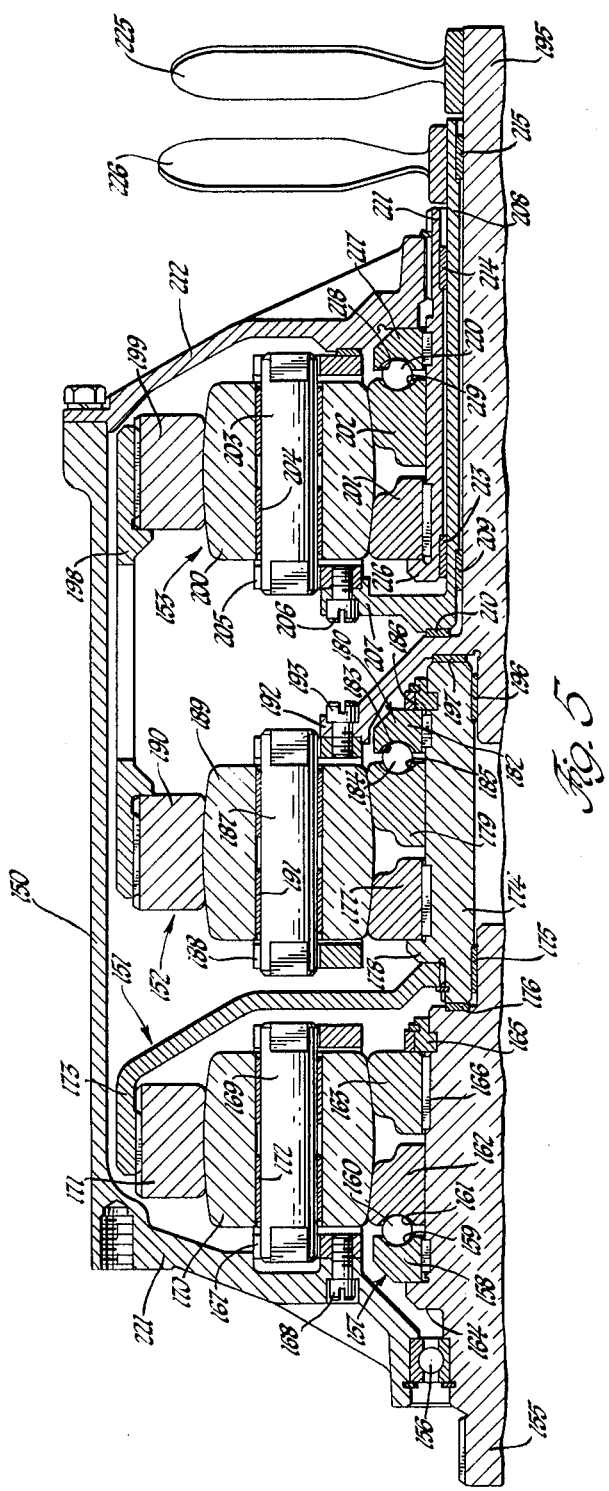
FIGURE 5 is a partially sectional view of a fourth embodiment of the invention.

Referring to FIGURE 5, there is shown a final design which is preferred particularly for a torpedo speed reducer drive.

In FIGURE 5 there is shown a housing 150 enclosing three reduction friction drive units 151, 152 and 153. A power input shaft 155 supported in housing 150 by a roller bearing 156 drives a pair of suns 162 and 163 through a torque loading device 157. More specifically, sun 162 has formed on one end thereof a ball ramp 161 and is supported on shaft 155 for angular rotation with respect to shaft 155. A torque loading disc 158 keyed to shaft 155 has formed on the end thereof a ball ramp 159. A ball 160 is disposed between the ramps 159 and 161 for applying axially thrust to sun 162 and for driving sun 162. Reaction thrust from disc 158 is transferred to input shaft 155 through an upstanding flange 164 formed on shaft 155. A reaction ring 165 grounds axial thrust from sun 163 to shaft 155. Sun 163 is keyed to shaft 155 by means of a key 166. A support 167, bolted to housing 150 by bolts 168, supports a pinion 170 in friction contact with suns 162, 163 and with a ring 171 by means of a pin 169. Pinion 170 is rotatably supported on pin 169 by bushing 172.

Ring 171 is connected for rotation with a sleeve shaft 174 by means of a drum drive connection 173 such that ring 171 drives sleeve shaft 174. The inner end of shaft 155 is piloted in sleeve shaft 174 and supported by a bushing 175 and a thrust bushing 176. A sun 177 is keyed to shaft 174 for rotation therewith and abuts a reaction flange 178 on shaft 174. A second sun 179 rotatably supported on shaft 174 is driven by shaft 174 through a ball ramp torque loading device 180. A ball ramp 185 on sun 179, and a ball ramp 183 on a disc 182, receive a ball 184 for applying axial thrust to sun 179 and for driving sun 179 in response to rotation of shaft 174. Disc 182 is keyed to shaft 174 and reaction thrust from disc 182 is grounded to shaft 174 through a retainer ring 186. A carrier support pin 187 supported in a carrier 188 supports a pinion 189 in friction contact with suns 177, 179 and a ring 190, there being a bushing 191 between pin 187 and pinion 189. Carrier 188 is bolted to a flange 192 of a first final power delivery shaft 195 by means of bolts 193. Shaft 195 is piloted in sleeve shaft 174 and is supported therein by means of a bushing 196 and a thrust bushing 197. Shaft 195 drives a propeller 225. Reduction unit 153 includes a power input ring 199 fixed for rotation with ring 190 of unit 152 by a drive drum 198, a pinion 200 and a pair of reaction suns 201 and 202. Pinion 200 is supported upon a pin 203 by means of a bushing 204. Pin 201 is supported in a planet carrier 205 bolted to a flange 207 of a second final power delivery shaft 208 by means of bolts 206. Pin 203 is positioned in rectangular slots in carrier 205 such that pin 203 may move radially with respect to the carrier. A bushing 209 is disposed between output shafts 195 and 208 and a thrust washer 210 is disposed between flange 207 of shaft 208 and flange 192 of shaft 195. A cylindrical ground sleeve 211 splined to housing end cover 212 is provided with bushings 213 and 214 for rotatably supporting shaft 208, and an additional bushing 215 is positioned between shafts 195 and 208 for support of shaft 195. Sun gear 201 is keyed to ground sleeve 211 there being an upstanding flange 216 formed on sleeve 211 for absorbing axial thrust from sun 201. A disc 217 keyed to ground sleeve 211 contacts end cover 212 and is provided with a ball ramp 218 at one end thereof. A ball 220 is disposed between ramp 218 and a ball ramp 219 formed on the end of sun 202 and for limiting angular rotation of sun 202 with respect to ground sleeve 211. Power delivery shaft 208 drives a propeller 226.

As stated, the support 167 of drive unit 151 is fixed to an end cover 221 of housing 150 and the ring 171 is used for output. This greatly simplifies the carrier design over that shown in FIGURE 4, since the carrier in the FIGURE 4 disclosure is normally rotated at a rather high speed of rotation. In addition, by providing a fixed carrier, the centrifugal loading on the ring-planet friction contact surfaces due to carrier rotation is eliminated. An additional improvement of the FIGURE 5 embodiment over that of FIGURE 4 is that all of the basic planetary components; that is, the rolling bodies and carriers of all three units, are of identical size and interchangeable. This greatly reduces the number of different parts required. In the FIGURE 5 embodiment, if input shaft 155 is rotated counterclockwise, output shaft 195 will rotate clockwise and output shaft 208 will rotate counterclockwise.

It is contemplated that all of the pinion support pins will be carried in slots in their respective carriers in the manner illustrated in FIGURE 3. In the FIGURE 5 embodiment, each drive unit will include six planets, although only one is shown. It is contemplated that the ball ramp torque loading devices, the suns, pinions and rings will be constructed and shaped in the manner taught in my copending application Serial No. 272,157, filed April 10, 1963, and entitled, "Friction Drive Mechanism." All of the pinion support pins of all of the units are likewise supported in their respective carriers in the manner taught in said application. The design of FIGURE 5 is capable of a 15 to 1 speed reduction and provides contrarotating, torque equalized output.

It will be understood that in the embodiments in FIGURES 2, 4 and 5, wherein the ring of one unit drives the ring of a second unit and wherein the carrier of one unit also constitutes a power delivery member, that torque equalization of the two output shafts is automatically accomplished. If for any reason, the torque on one propeller is decreased, as may occur particularly to cavitation, the speed of that particular propeller will automatically increase so as to equalize the torque between the propellers at all times. The friction drives are very smooth and quiet due to the smooth and continuous tractive forces within lubricated metallic rolling contacts and prevent development of periodic vibratory disturbances as is a detrimental attribute of gears. The drive is arranged such that all axial and radial forces are internally balanced within the rolling bodies and avoids the need for heavily loaded thrust washers, thereby further facilitating a vibration-free mode of operation and noise reduction. For driving the propellers of a torpedo, the FIGURE 5 embodiment is the preferred embodiment due to the fact that all of the rolling bodies and carriers are identical and interchangeable, thereby minimizing the number of different parts required for the complete assembly. The FIGURE 5 embodiment provides adequate speed reduction (15 to 1) for most prime movers, provides equalization of torque output of the two final power delivery shafts and is a compact design particularly suited for installations where space requirements are critical as in a torpedo. The reduction ratio available in the FIGURE 5 embodiment, wherein all of the rotating planetary parts of the three units are identical, is 15 to 1, which is an adequate speed reduction for use in many installations such as, for example, a torpedo drive. The speed reduction provided in the FIGURE 1 and FIGURE 2 embodiments is 8 to 1, while that of FIGURE 4 is 50 to 1. The selection of speed reducer will be matched to the type of prime mover employed to provide a desirable output speed.

I claim:

1. A multistage friction drive assembly comprising a housing, a power input shaft rotatably supported in said housing, a first power delivery shaft, a first speed reducer unit for driving said power delivery shaft in one direction of rotation comprising a first pair of suns driven by said input shaft, a support, a ring, a pinion rotatably supported by said support and in friction contact with each of said first pair of suns and with said ring, means connecting said ring to said first power delivery shaft for driving said shaft, a second power delivery shaft, a second speed reducer unit for driving said second power delivery shaft in a direction opposite to the direction of rotation of said first power delivery shaft including a second pair of spaced suns driven by said power input shaft, a carrier fixed to said second power delivery shaft for driving said shaft, a pinion supported on said carrier in friction contact with said second pair of suns and second ring, and means for preventing rotation of said second ring.

2. A multistage friction drive assembly comprising a housing, a power input shaft rotatably supported in said housing, a first power delivery shaft rotatably supported in said housing, a first speed reducer unit for driving a first power delivery shaft in one direction of rotation comprising a first pair of spaced suns driven by said power input shaft, a support, a ring, a pinion supported upon said support in friction contact with said ring and both of said suns, means connecting said ring to said first power delivery shaft for driving said shaft in one direction of rotation, a second speed reducer unit comprising a second pair of spaced suns driven by said power input shaft, a planet carrier, a second power delivery shaft driven by said carrier, a second ring, a second pinion supported in said carrier in friction contact with said second ring and both of said second pair of suns, means preventing rotation of said second ring, the ring radius of said second ring being smaller than the ring radius of said first ring by the magnitude of the radius of said suns, and the radius of each of said suns being equal to each other, said second drive unit being effective to drive said second power delivery shaft in a direction opposite to the direction of rotation of said first power delivery shaft and at the same speed of rotation as that of said first power delivery shaft.

3. A multistage friction drive assembly comprising a housing, a power input shaft supported for rotation in said housing, a first power delivery shaft supported in said housing, said power input shaft having an inner end piloted in said power delivery shaft, a first speed reducer unit for driving said first power delivery shaft in one direction of rotation comprising a first pair of suns supported on said power input shaft, said suns being axially movable with respect to said shaft, a support supported in said housing, a ring, a pinion rotatably supported on said support in friction contact with said ring and both of said first pair of suns, torque responsive means for drivingly connecting said suns to said power input shaft for rotation therewith and for moving said suns into contact with said pinion, a drum connecting said ring to said first power delivery shaft for driving said shaft, a second speed reducer unit comprising a second power delivery shaft rotatably supported in said first power delivery shaft, a planet carrier supported upon said second power delivery shaft for driving said shaft, a second pair of suns supported on said power input shaft for limited angular rotation and for axial movement with respect to said shaft, a second ring, a second pinion supported in said second carrier in friction contact with said ring and both of said second pair of suns, torque responsive means drivingly connecting said second pair of suns to said power input shaft and for moving said suns into contact with said second pinion, and means connecting said second ring to said first-mentioned support for preventing rotation of said second ring, the radius of said second pinion being less than that of said first pinion by the magnitude of the sun radius, all of said suns being of equal radius, whereby said second unit drives said second power delivery shaft at the same speed of rotation as that of said first power delivery shaft and in the opposite direction of rotation to that of said first power delivery shaft.

4. A multistage planetary friction drive assembly for transmitting torque from a power input shaft to first and second power delivery shafts comprising a housing, a planet carrier supported upon said first power delivery shaft for driving said shaft in one direction of rotation, a pinion supported in carrier, means including at least one sun driven by said input shaft and in friction contact with said pinion, a ring in friction contact with said pinion, a second planet carrier supported on said second power delivery shaft for driving said second power delivery shaft in the opposite direction of rotation from that of said first power delivery shaft, reaction means grounded to said housing including at least one sun, a pinion supported in said carrier in friction contact with said reaction means, a second ring in friction contact with said pinion, and means connecting said rings to each other for rotaton as a unit, the speed of rotation of said power delivery shafts being automatically varied to equalize the torque transmitted through said shafts.

5. Speed reducing mechanism for driving contra-rotating propellers at equal torque comprising a housing, a first power delivery shaft, a first propeller driven by said shaft, a second power delivery shaft, a second propeller driven by said second power delivery shaft, a power input shaft, a first speed reducer unit for driving said first power delivery shaft in one direction of rotation comprising power input means driven by said power input shaft, a planet carrier supported on said first power delivery shaft for driving said shaft, a planet pinion supported in said carrier in friction contact with said power input means, second power delivery means comprising a first ring in friction contact with said pinion, a second speed reducer unit for driving said second power delivery shaft in the opposite direction of rotation from that of said first power delivery shaft, said second speed reducer unit including reaction means grounded to said housing, a second planet carrier supported on said second power delivery shaft for driving said shaft, a pinion supported on said second carrier in friction contact with said reaction means, a second ring in friction contact with said second carrier, and means connecting said rings to each other for rotation as a unit, said first and second speed reducer units interacting to vary the speed of rotation of said output shafts to automatically maintain equal torque output on both of said shafts.

6. A multistage planetary friction drive assembly comprising a housing, a power input shaft, a first power delivery shaft, a pair of spaced suns supported on said power input shaft for axial and limited rotary motion with respect to said shaft, means for driving said suns from said power input shaft including at least one ball ramp torque loading device, a planet carrier supported on said first power delivery shaft for driving said shaft, a ring, a planet pinion supported in said carrier in friction contact with said suns and said ring, a second speed reducer unit comprising a second power delivery shaft, a pair of spaced suns supported upon said housing for axial and limited angular rotation with respect to said housing, means for grounding said last-mentioned suns to said housing including at least one ball ramp torque loading device, a planet carrier supported upon said second power delivery shaft for driving said shaft, a ring, a pinion supported in said carrier in friction contact with said last-mentioned pair of suns and said last-mentioned ring, and means connecting said rings to each other for rotation as a unit, said first gear unit being effective to rotate said first power delivery shaft in one direction of rotation and said second gear unit being effective to rotate said second power delivery shaft in the opposite direction of rotation and at the same speed of rotation as said first power delivery shaft when the torque load upon said shafts is equal, said speed reducer units being effective to vary the speed of rotation of said shafts to automatically equalize the torque transmitted to said power delivery shafts.

7. A speed reducing assembly for driving contra-rotating power delivery shafts at equal torque comprising a housing, a power input shaft, first and second power delivery shafts, a first speed reducer unit comprising a planet carrier fixed to said first power delivery shaft for driving said shaft in one direction of rotation, a planet pinion supported in said carrier, means for driving said pinion including a sun driven by said power input shaft and in friction contact with said pinion, a rotatable ring driven by said pinion and in friction contact with said pinion, said first power delivery shaft being rotatably supported in and extending through said second power delivery shaft, a second speed reducer unit comprising a second planet carrier fixed to said second power delivery shaft for driving the same, a second pinion supported in said second carrier, a hollow cylindrical sleeve fixed to said housing, said second power delivery shaft extending through and being rotatably supported in said sleeve, a reaction sun grounded to said sleeve and in friction contact with said second pinion, a second ring in friction contact with said second pinion, and a drive connection between said first and second rings for driving said second ring in response to rotation of said first ring, said drive units being automatically operable to control the relative speeds of rotation of said power delivery shafts to equalize the torque delivered by said shafts, respectively.

8. A speed reducer assembly for driving contra-rotating power delivery shafts at equal torque comprising a housing, a power input shaft, a first speed reducer unit comprising a support fixed to said housing, a pinion supported by said support, a sun driven by said input shaft and in friction contact with said pinion, a power delivery ring in friction contact with said pinion, a hollow sleeve shaft driven by said ring, a second speed reducer unit including a first final power delivery shaft, a planet carrier fixed to said first final power delivery shaft for driving the same, a planet pinion supported in said carrier, means for driving said last-mentioned pinion including a sun in friction contact therewith and driven by said sleeve shaft, a second ring in friction contact with said last-mentioned pinion and driven thereby, third speed reducer unit including a second final power delivery shaft, a carrier fixed to said shaft for driving the same, a pinion supported in said carrier, a reaction assembly including a sun anchored to said housing and in friction contact with said last-mentioned pinion, a ring in friction contact with said last-mentioned pinion, and a drum connecting the ring of the second speed reducer unit to the ring of the third speed reducer unit for unitary rotation with the ring of said second speed reducer unit, said second and third speed reducer units being automatically operable to vary the speed of rotation of said final power delivery shafts to equalize the torques delivered by said shafts.

9. A speed reducer assembly for driving contra-rotating power delivery shafts at equal torque comprising a housing, a power input shaft, a first speed reducer unit comprising a support fixed to said housing, a pinion supported by said support, means for driving said pinion including a sun driven by said input shaft and in friction contact with said pinion, a power delivery ring in friction contact with said pinion, a hollow intermediate sleeve shaft, means connecting said ring to said sleeve shaft for driving said sleeve shaft, a second speed reducer unit comprising a first final power delivery shaft, one end of said power input shaft and one end of said first final power delivery shaft being piloted in said hollow intermediate sleeve shaft for rotatably supporting said intermediate hollow sleeve shaft, a planet carrier fixed to said first final power delivery shaft for driving the same, a pinion supported in said carrier, friction drive means driven by said intermediate sleeve shaft and in friction contact with said pinion for driving the same, a second ring in friction contact with said pinion and driven by said pinion, a third speed reducing unit including a second final power delivery shaft, said first final power delivery shaft extending through and being rotatably supported in said second final power delivery shaft, a planet carrier fixed to said second final power delivery shaft for driving the same, a pinion supported in said carrier, a sleeve extension fixed to said housing and supporting said second final power delivery shaft for rotation therein, a reaction member in friction contact with said pinion and grounded to said sleeve, a third ring in friction contact with said pinion for driving said pinion, and a drum connecting said second and third rings whereby said third ring is driven by said second ring, said second and third speed reducer units being automatically operable to vary the speed of rotation of said first and second final power delivery shafts to equalize the torque transmitted by said final power delivery shafts.

References Cited by the Examiner
UNITED STATES PATENTS

| | | | |
|---|---|---|---|
| Re. 18,175 | 9/1931 | Erban | 74—798 |
| 1,368,570 | 2/1921 | Philippeau | 74—798 |
| 2,555,119 | 5/1951 | Elliott | 74—796 |
| 3,188,884 | 6/1965 | Bancroft | 74—665 |

DAVID J. WILLIAMOWSKY, *Primary Examiner.*

DON A. WAITE, *Examiner.*

LEONARD H. GERIN, *Assistant Examiner.*